United States Patent
Kooken et al.

[11] Patent Number: 5,845,553
[45] Date of Patent: *Dec. 8, 1998

[54] STATOR LAMINATION JIG SYSTEM

[75] Inventors: Gale A. Kooken, Englewood; John W. Murphy, Kettering; Roger D. Fleming, Centerville, all of Ohio

[73] Assignee: Dayton-Phoenix Group, Inc., Dayton, Ohio

[*] Notice: This patent issued on a continued prosecution application filed under 37 CFR 1.53(d), and is subject to the twenty year patent term provisions of 35 U.S.C. 154(a)(2).

[21] Appl. No.: 623,628

[22] Filed: Mar. 28, 1996

Related U.S. Application Data

[62] Division of Ser. No. 368,917, Jan. 5, 1995, Pat. No. 5,551,142.

[51] Int. Cl.⁶ .................................. B26D 3/14; B26D 7/06
[52] U.S. Cl. .................................. 83/23; 83/36; 83/76.6; 83/109; 83/267; 83/282; 83/410.9; 83/411.7; 83/414; 83/733; 83/917
[58] Field of Search .................... 83/36, 35, 917, 83/76.6, 76.7, 76.8, 76.9, 257, 267, 282, 410.7, 410.9, 411.7, 414, 733, 734, 109, 23, 27; 269/63, 61, 55

[56] References Cited

U.S. PATENT DOCUMENTS

| | | | |
|---|---|---|---|
| 1,361,883 | 12/1920 | Littman | 269/61 X |
| 2,005,261 | 6/1935 | Leland | 78/48 |
| 2,396,378 | 3/1946 | Larsen | 83/917 X |
| 2,741,311 | 4/1956 | Raiche | 83/282 X |
| 2,934,978 | 5/1960 | Estabrook | 269/55 X |
| 3,027,632 | 4/1962 | Baynes et al. | 83/36 X |
| 3,028,159 | 4/1962 | Hohwart | 269/137 |
| 3,127,804 | 4/1964 | Bufalino | 83/267 X |
| 3,459,079 | 8/1969 | De Gain | 83/267 X |
| 3,460,415 | 8/1969 | Philipp | 83/267 X |
| 3,603,191 | 9/1971 | Muller et al. | 83/414 X |
| 3,623,385 | 11/1971 | Schneider et al. | 83/267 X |
| 3,698,273 | 10/1972 | Richard et al. | 83/267 X |
| 3,825,245 | 7/1974 | Osburn et al. | 269/63 X |
| 3,835,744 | 9/1974 | Wendt, III | 83/267 |
| 4,013,281 | 3/1977 | Tokunaga | 269/61 |
| 4,197,772 | 4/1980 | Anderson et al. | 83/411.7 X |
| 4,331,049 | 5/1982 | Bergmann et al. | 83/267 |
| 4,464,826 | 8/1984 | Bair | 29/593 |
| 4,602,541 | 7/1986 | Benzinger et al. | 83/36 |
| 4,629,109 | 12/1986 | Matsushita | 228/49.1 |
| 4,836,070 | 6/1989 | Spano et al. | 83/257 X |
| 4,899,998 | 2/1990 | Teramachi | 269/63 |
| 4,901,990 | 2/1990 | Frechette | 269/25 |
| 4,942,797 | 7/1990 | Nakamura | 83/76.9 |
| 5,174,009 | 12/1992 | Martin | 29/564.6 |
| 5,333,525 | 8/1994 | Schlegel | 83/917 X |
| 5,373,622 | 12/1994 | Neuenschwander | 29/596 |

FOREIGN PATENT DOCUMENTS

| | | | |
|---|---|---|---|
| 2062229 | 6/1972 | Germany | 83/917 |
| 2206330 | 8/1973 | Germany | 83/917 |
| 4201034 A | 7/1992 | Japan | 269/55 |
| 688314 | 9/1979 | U.S.S.R. | 269/55 |
| 608338 | 9/1948 | United Kingdom | 83/917 |
| 871095 | 6/1961 | United Kingdom | 269/63 |

*Primary Examiner*—M. Rachuba
*Assistant Examiner*—Charles Goodman
*Attorney, Agent, or Firm*—Thompson Hine & Flory LLP

[57] ABSTRACT

The invention is a stator lamination jig system which comprises a centrally located spindle and a support for a stator lamination having a plurality of holes therein. The support is rotatively-mounted on the spindle for driving the lamination during a notching operation. A plate is included to secure the lamination on the support and a non-rotatable ejector is located below the support which has a lowered position and a raised position. An ejection cylinder is seated upon the ejector which is shaped and positioned to extend through holes in the support. The invention also comprises a cylinder connected to the ejector for driving the ejector. When the cylinder is actuated upwards, the ejector is in a raised position which urges the ejection cylinder through the holes in the support to cause the lamination to be released from the jig.

7 Claims, 3 Drawing Sheets

STATOR LAMINATION JIG SYSTEM

This is a divisional of application Ser. No. 08/368,917, filed Jan. 5, 1995, now U.S. Pat. No. 5,551,142.

BACKGROUND OF THE INVENTION

The present invention relates to devices for making repetitive stamping operations on a workpiece and, more particularly, to devices for stamping notches in stator laminations.

Typically, large electric motors include a stator core which is composed of a stack of relatively thin, circular laminations made of metal such as copper. Grooves are formed in the core of the stator by notching teeth-like slots on each of the laminations which are aligned when the laminations are arranged in a stack. Coils or rods formed from several insulated wires (windings) are secured in such slots. The slots are typically formed by placing pre-notched stator laminations, which have a central opening already formed therein, over a spindle or hub on a turntable which indexes the laminations between a die set which forms the notches. An example of such a stator lamination is disclosed in 1995 U.S. Pat. No. 5,551,142, the disclosure of which is incorporated herein by reference.

A disadvantage of such a prior art system is that it lacked means for positively securing the pre-notched laminations to the turntable, and for automatically removing the finished laminations from the spindle of the turntable. Further, while such progressive stamping devices are less expensive than devices for notching the entire lamination at once, they are less accurate since the lamination must be indexed as the notching procedure is performed.

Accordingly, there is a need for a stator lamination jig system which facilitates the mounting of the pre-notched lamination on the turntable, and the removal of the finished, notched lamination from the turntable. Further, there is a need for a stator lamination jig system which securely holds the lamination during the notching process without manual assistance.

SUMMARY OF THE INVENTION

The present invention is a stator lamination jig system for securely clamping a pre-notched stator lamination during a notching process, and for ejecting the finished, notched lamination from the jig upon completion of the notching process. In a preferred embodiment of the invention, the jig system includes an air actuated lower support table which is actuated to hold the lamination during notching, and subsequently is actuated to release the finished, notched lamination at the conclusion of the notching process.

The invention also includes an air actuated hold-down plate which clamps the lamination against the support table during the notching process, thereby eliminating the need for manual holding of the lamination during notching. The lower support table includes a circular ejection plate having a plurality of ejection plugs seated thereon and a drive plate, which supports the lamination during notching.

During the notching operation, the support table is lowered to allow the ejection plugs to retract into the drive plate, while the hold-down plate is clamped against the lamination to fix the lamination against the drive plate. When the notching procedure is completed, the lower support table is actuated to drive the circular ejection plate and ejection plugs upwardly to release the lamination from its seated position on the drive plate.

Accordingly, it is an object of the present invention to provide a stator lamination jig system in which the clamping of the lamination against a support surface and ejection of the notched lamination is fully automated; a system in which the lamination is clamped securely during the notching process, so that the speed of the notching operation can be increased without the loss of accuracy; a system which is relatively inexpensive to construct and which is reliable and easy to maintain.

Other objects and advantages of the present invention will be apparent from the following description, the accompanying drawings and the appended claims.

DETAILED DESCRIPTION

Figure 1:
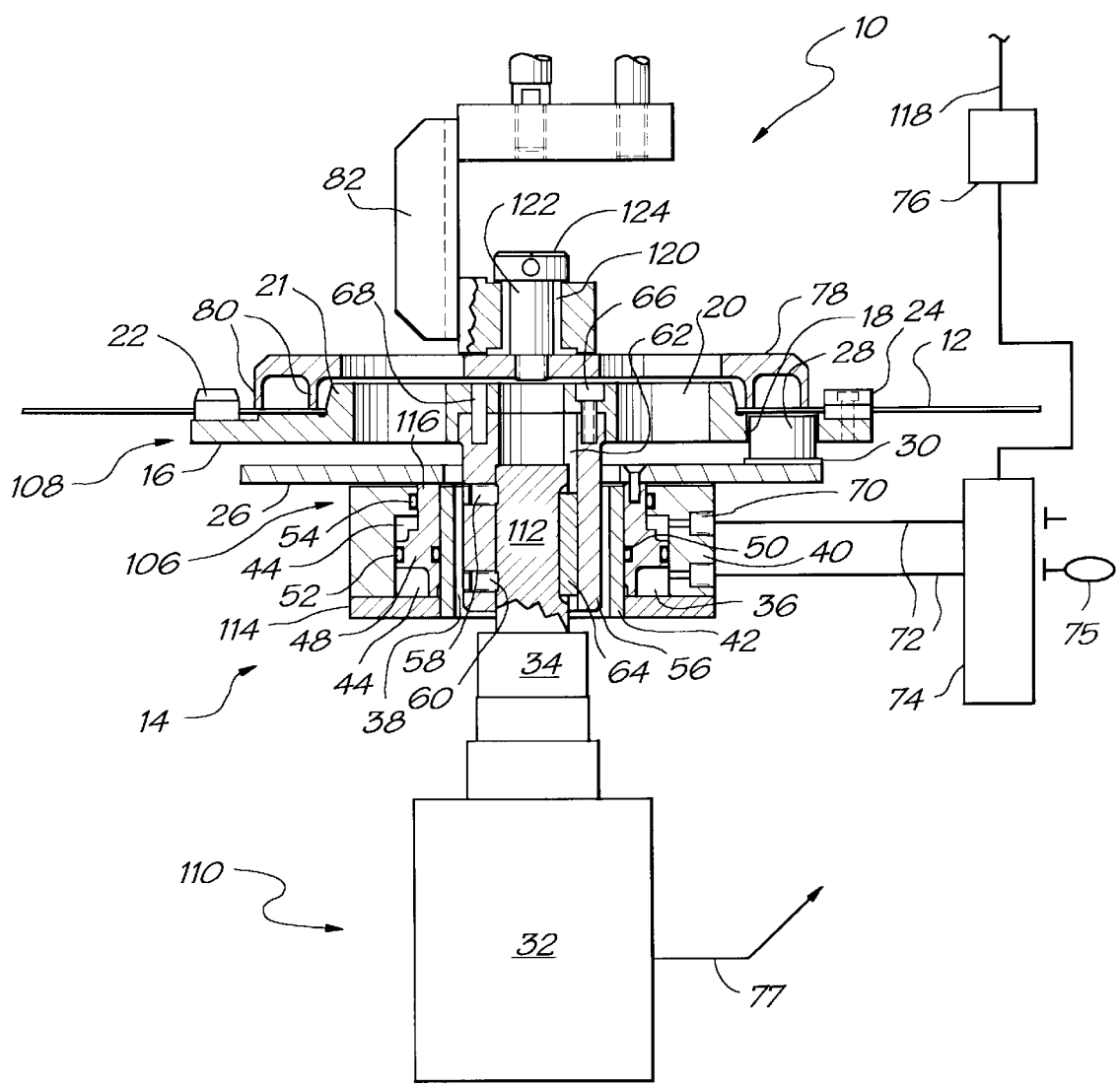
FIG. 1 is a front elevational view, partially in section, of the table assembly of the stator lamination jig system of the present invention.

As shown in FIG. 1, the stator lamination jig system of the present invention, generally designated 10, supports a typical stator lamination 12. The jig system 10 includes an air actuated lower support table, generally designated 14, which includes an ejection cylinder assembly 106, an upper assembly 108, and a drive motor assembly 110. The table 14 includes a rotatable, substantially circular drive plate 16 for supporting the stator lamination 12 (see also FIG. 2).

Figure 2:
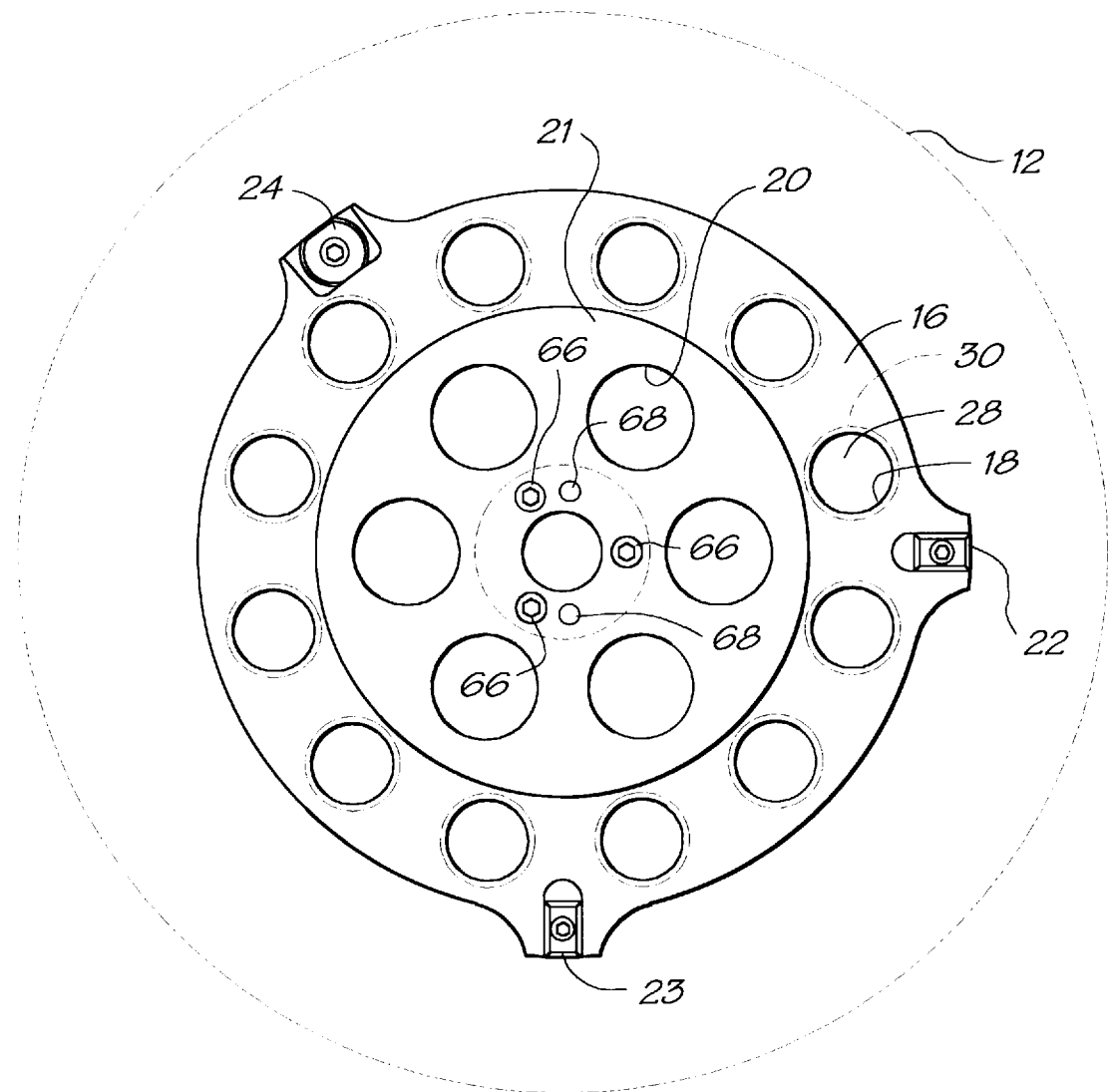
FIG. 2 is a top plan view of the system shown in FIG. 1.

As shown in FIG. 2, the drive plate 16 includes a plurality of through holes 18 on an outer periphery thereof and a plurality of drill holes 20 extending through and spaced about a radially inner, raised hub portion 21 thereof. Drill holes 20 in the drive plate reduce the weight of the equipment. Spaced along the outer periphery of the drive plate 16 are three adjustable location bosses 22,23,24, of which bosses 22 and 23 are rectangular. Bosses 22 and 23 are shaped to fit notches formed in the lamination 12 (see FIG. 1) and can be replaced with differently shaped bosses to accommodate different sized laminations 12.

The table 14 includes an ejection plate 26, typically made of 1018 steel, and a plurality of nylon ejection plugs 28 slidably supported thereon. The ejection plugs 28 each include small rim portions 30 at lower ends thereof, and the ejection plugs 28 are shaped and positioned to slidably extend through the holes 18 of drive plate 16. The rim portions 30 prevent the ejection plugs 28 from sliding upwardly and out of their corresponding holes 18. The number of nylon ejection plugs 28 employed preferably corresponds to the number of through holes 18 in the drive plate 16.

The ejection plate 26 is rotationally fixed and has a substantially flat upper surface which allows the rims 30 of the ejector plugs 28 to slide over the surface of the ejection plate when the drive plate is rotated by the motor assembly 110, as will be described in greater detail below.

The lamination support system is driven by the motor assembly 110, which includes indexing motor 32 shown in FIG. 1. The motor 32 includes an output shaft 34 which extends through the ejection cylinder assembly 106 and engages the drive plate 16. The output shaft 34 extends through the ejection plate 26 and drive plate 16 to act as the spindle for the table 14 during the notching process.

The drive plate 16 includes a cylindrical drive bushing 56 which extends downwardly therefrom and is shaped to receive the reduced diameter upper end 112 of the output shaft 34. Upper end 112 is non-rotatably secured to bushing 56 by a key 64 which engages keyway 62. Set screws 58, 60 are threaded through bushing 56 and retain upper end 112 within bushing 56. Bushing 56 is attached to a recess formed in the hub 21 of drive table 16 by screws 66 and the drive table is radially located relative to output shaft 34 by locating pin 68, which extends through the hub bushing. Consequently, the output shaft 34 of motor 32 rotates the bushing 56 which, in turn, rotates drive plate 16, without rotating ejection cylinder assembly 106.

The support table 14 includes an ejection cylinder assembly, generally designated 106, which includes the ejection plate 26. The ejection assembly 106 includes an ejection cylinder 36 having a centrally located opening 38 through which the output shaft 34 of the indexing motor 32 extends. The ejection cylinder 36 includes an outer cylindrical housing 40 and an inner cylindrical wall 42 which defines an inner chamber 44. The inner cylindrical wall 42 is connected at a lower end to the outer housing 40 by annular cylinder wall 114, which extends between the inner wall and outer housing, but is unconnected to the outer housing at its upper end.

The ejection cylinder 36 also includes a piston 48 shaped to reciprocate within the chamber 44. The piston 48 is annularly shaped and includes three O-rings 50,52,54. The inner O-ring 50 provides a seal between the piston 48 and the inner cylindrical wall 46, the outer O-ring 52 provides a seal between the piston 48 and the outer cylindrical housing 40 and the upper O-ring 54 provides a seal between the upper piston shaft 116 and the outer housing 40.

The ejection cylinder 36 includes two side ports 70, formed in housing 40, which are connected by hoses 72 to a pneumatic valve 74. The valve 74 is connected to, and regulates the flow of compressed air from, a source 75 of compressed air, which may be shop air or a compressed air cylinder. The valve 74 has 3 positions: a first position in which no air enters or escapes the ejection cylinder 36, thereby holding the piston 48 (and ejection plate 26) in position; a second position in which compressed air from source 75 enters the cylinder 36 above piston 48, thereby pressurizing that portion of the chamber and driving the piston downwardly, which lowers ejection plate 26 and actuates the portion of the chamber below the piston, and conversely, a third position wherein the portion of the chamber below the piston is pressurized, thereby driving the piston and ejection plate upwardly and evacuating the portion of the chamber above the piston.

The valve 74 is connected to a programmable logic controller ("PLC") 76 for control of the cylinder assembly 114 in the aforementioned manner. The PLC 76 also actuates the indexing motor 32 through control line 77. The PLC 76 therefore controls when the indexing motor 32 begins operation, in coordination with the associated notching equipment 102 (see FIG. 3), which PLC controls through line 118.

Figure 3:
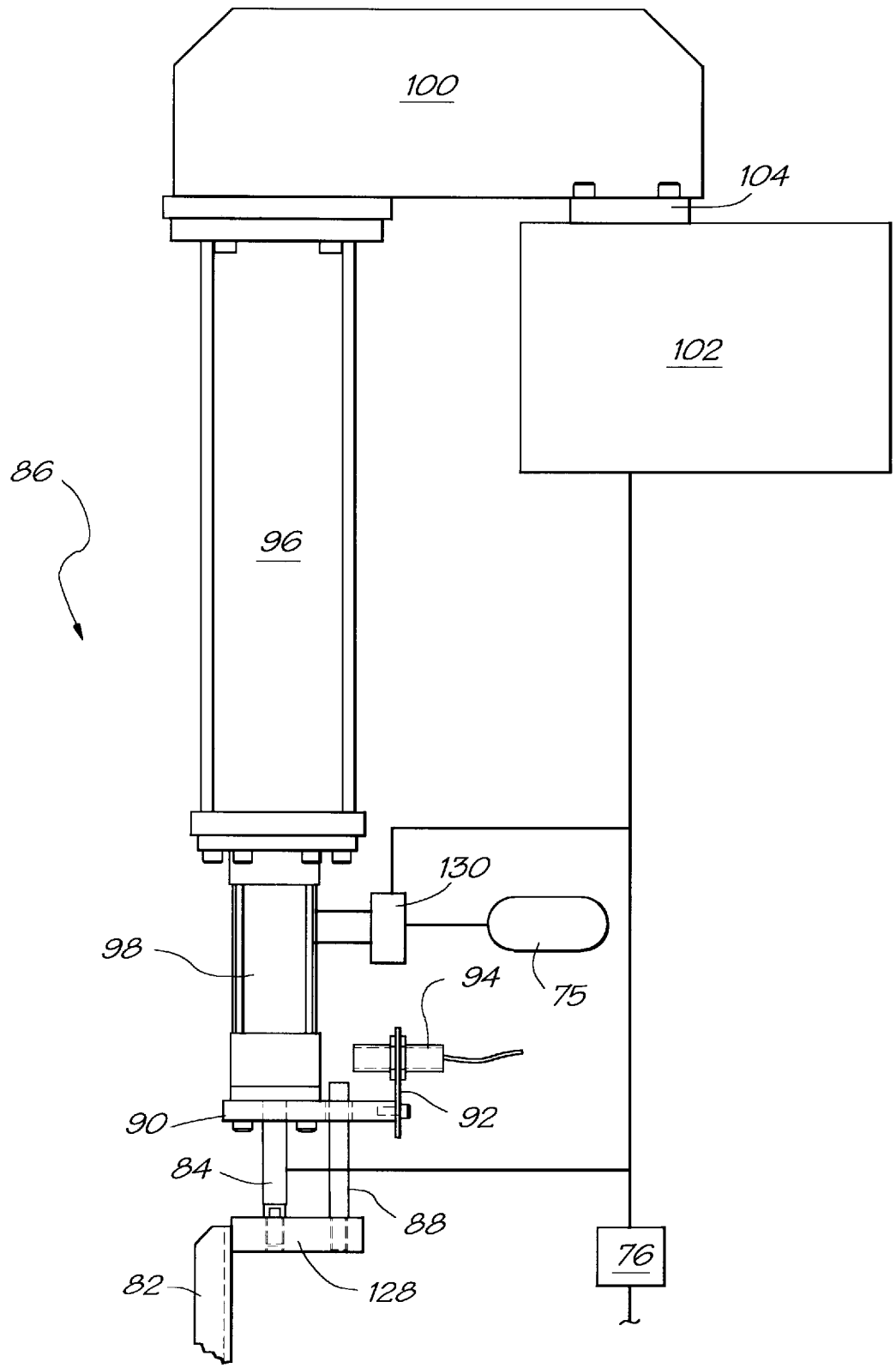
FIG. 3 is a front elevational view of the upper assembly of the system of FIG. 1.

As shown in FIG. 3, the jig system 10 includes a generally circular hold-down plate 78 which is positioned above the drive plate 16 (FIG. 1) and clamps the lamination 12 against the drive table from above. The hold-down plate 78 is typically made of 6150 steel and includes concentric, downwardly extending inner and outer annular ridges 80. These ridges 80 provide the contact with the stator lamination 12 and clearance to accommodate the hub 21. The hold-down plate 78 also has a plurality of through holes (not shown) to reduce weight.

The jig system 10 also includes bracket 82, which includes a bushing 120 that rotatably receives a shaft 122 which is attached to the plate 78. The shaft 122 is journaled into the bushing 120 and includes an enlarged head 124 which prevents the shaft from sliding downwardly through the bushing.

As shown in FIG. 3, a double-acting pneumatic cylinder 98 is mounted on H-beam 96 which, in turn, is attached to support bracket 100. Support bracket 100 is mounted to a conventional notching press, schematically shown at 102, by means of bracket 104. H-beam 96 supports double acting pneumatic cylinder 98 which, in turn, is connected rod plate 90. Rod plate 90 supports sensor mounting plate 92 which in turn supports proximity switch 94. PLC 76 controls valve 130 which controls compressed air flow to cylinder 98 from source 75, so that PLC can coordinate the action of cylinder 98 with cylinder 36 (FIG. 1). Further, PLC controls notching machine 102, so that the operation of the machine is coordinated with the operation of the jig system 10.

The cylinder rod 88 of the cylinder 98 is attached to bracket 82 (see also FIG. 1). Upper plate 128 of bracket 82 supports indicator rod 88, which is slidably received by plate 90, and oriented such that displacement of bracket 82 displaces rod 88 past switch 94. This switch 94 is used to determine whether the hold-down plate 78 is in an up (ejection) position or down (lamination securing) position. The guide rod 88 cooperates with the up switch 94 in order to control rotation.

The operation of the jig system 10 is as follows. The pre-notched stator lamination 12 is first placed on the drive table 16, as shown in FIG. 1 and shown in phantom in FIG. 2. At this time, the table 14 is lowered so that the ejection plugs 28 are permitted to retract by gravity below the upper surface of the drive plate. The cylinder 84 is actuated to displace the hold down plate 78 downwardly to clamp the lamination 12 against the plate 16, as shown in FIG. 1.

The indexing motor 32 is actuated by the PLC 76 to drive the lower support table 14, while the notching device 102 performs a notching operation on the lamination 12. The engagement of the hold-down plate 78 against the top of the stator lamination 12 causes the hold-down plate to rotate as well. The PLC coordinates the indexing of the plate 16 with the operation of the notching machine 102.

When the notching procedure is completed, the PLC 76 actuates the cylinder 98 to raise hold-down plate 78 and actuates the cylinder 36 to drive the circular ejection plate 26 and nylon ejection plugs 28 upwardly to automatically displace the finished, notched lamination 12 from its seated position on the lower support table 14. The stator lamination jig 10 is then ready for the next pre-notched lamination.

Having described the invention in detail and by reference to preferred embodiments thereof, it will be apparent that modifications and variations are possible without departing from the scope of the invention defined in the appended claims.

What is claimed is:

1. A method of automatically securing and releasing stator laminations from a jig comprising the steps of:
   placing a stator lamination on a substantially circular drive plate of said jig, said drive plate including plurality of through holes arranged about an outer periphery thereof, each of said holes receiving an ejection plug therethrough;
   securing said lamination with a hold-down plate;
   incrementally rotating said drive plate with an indexing motor, such that said ejection plugs side over a stationary ejection plate;

subsequent to each of said incremental rotations, forming a notch on said lamination; removing said hold-down plate from engagement with said lamination; and displacing said ejection plate upwardly to urge said plurality of ejection plugs upwardly through said holes, thereby causing said lamination to become disengaged from said drive plate.

2. The method of claim 1 further comprising the step of raising said hold-down plate with a double-acting cylinder.

3. The method of claim 1 wherein said ejection plate is driven by an air actuated ejection cylinder, and said displacing step includes the step of actuating said ejection cylinder.

4. The method of claim 1 further comprising the step of coordinating said indexing and notching steps by means of a programmable logic controller.

5. The method of claim 4 wherein said steps of removing said hold-down plate and urging said ejection plugs are controlled by said programmable logic controller.

6. The method of claim 1 further comprising the step of detecting a condition wherein said hold-down plate is in a lamination securing position.

7. A method of automatically securing and releasing stator laminations from a jig comprising the steps of:

placing a stator lamination on a drive plate of said jig, said drive plate having a rotational axis and including a plurality of through holes arranged in a circular ring about said rotational axis, each of said holes receiving an ejection plug therein;

securing said lamination with a hold-down plate;

rotating said drive plate such that said ejection plugs slide over a stationary ejection plate positioned below said drive plate;

forming a notch on said lamination subsequent to said rotating step; removing said hold-down plate from engagement with said lamination; and displacing said ejection plate upwardly to urge said plurality of ejection plugs upwardly through said holes, thereby disengaging said lamination from said drive plate.

\* \* \* \* \*